United States Patent
Rolland et al.

(10) Patent No.: US 8,900,415 B2
(45) Date of Patent: Dec. 2, 2014

(54) PROCESS AND DEVICE FOR FLUIDIZED BED TORREFACTION AND GRINDING OF A BIOMASS FEED FOR SUBSEQUENT GASIFICATION OR COMBUSTION

(75) Inventors: Matthieu Rolland, Vernaison (FR); Sylvain Louret, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 1220 days.

(21) Appl. No.: 12/745,289

(22) PCT Filed: Oct. 17, 2008

(86) PCT No.: PCT/FR2008/001456
§ 371 (c)(1),
(2), (4) Date: Apr. 7, 2011

(87) PCT Pub. No.: WO2009/090335
PCT Pub. Date: Jul. 23, 2009

(65) Prior Publication Data
US 2011/0209977 A1    Sep. 1, 2011

(30) Foreign Application Priority Data

Nov. 30, 2007 (FR) ..................... 07 08377

(51) Int. Cl.
| | |
|---|---|
| C10B 49/10 | (2006.01) |
| C10B 53/02 | (2006.01) |
| C10L 5/40 | (2006.01) |
| B01J 8/18 | (2006.01) |
| C10L 9/08 | (2006.01) |
| F26B 3/08 | (2006.01) |
| C10J 3/54 | (2006.01) |
| C10L 5/44 | (2006.01) |

(52) U.S. Cl.
CPC ............ *C10L 5/44* (2013.01); *C10J 2300/0916* (2013.01); *C10B 49/10* (2013.01); *B01J 8/1872* (2013.01); *C10J 2300/0903* (2013.01); *Y02E 50/15* (2013.01); *C10L 9/083* (2013.01); *Y02E 50/14* (2013.01); *F26B 2200/02* (2013.01); *C10B 53/02* (2013.01); *F26B 3/082* (2013.01); *C10J 3/54* (2013.01); *Y02E 50/10* (2013.01); *Y02E 50/30* (2013.01); *F26B 2200/24* (2013.01)
USPC .......... 201/7; 34/387; 44/606; 44/629; 201/8; 201/31; 202/96; 202/99; 241/57

(58) Field of Classification Search
CPC ........ C10B 49/10; C10B 53/02; B10J 8/1872; B10J 8/44; C10J 3/54; C10L 5/44; C10L 9/083; F26B 3/082
USPC ........... 201/7, 8, 31; 202/96, 99, 105; 34/387; 241/47, 39, 57; 44/605, 606, 629, 633; 585/240, 242; 422/139, 143
See application file for complete search history.

(56) References Cited

U.S. PATENT DOCUMENTS

| | | | | | |
|---|---|---|---|---|---|
| 3,311,307 | A | * | 3/1967 | Lopker | ............................ 241/39 |
| 3,992,266 | A | * | 11/1976 | Aktay et al. | ...................... 201/8 |
| 5,680,996 | A | * | 10/1997 | Sadler, III | ....................... 241/57 |
| 2003/0221363 | A1 | | 12/2003 | Reed | |

FOREIGN PATENT DOCUMENTS

| | | |
|---|---|---|
| DE | 224649 A1 | 7/1985 |
| DE | 224649 T | 7/1985 |
| DE | 19618880 A1 | 11/1997 |
| DE | 19618880 W | 11/1997 |
| EP | 0039270 A2 | 11/1981 |
| EP | 0039270 W | 11/1981 |
| FR | 1422951 A | 1/1966 |
| GB | 1080605 A | 8/1967 |
| WO | 9212796 A1 | 8/1992 |
| WO | PCT0801456 R | 7/2009 |

* cited by examiner

*Primary Examiner* — Jill Warden
*Assistant Examiner* — Joye L Woodard
(74) *Attorney, Agent, or Firm* — Millen, White, Zelano & Branigan, P.C.

(57) ABSTRACT

A process and a unit for fluidized bed torrefaction and grinding of particles of a biomass with a largest dimension of 2 cm to 5 cm, and which unit contains an envelope having a general shape of a sector having a) two substantially vertical walls delimiting that sector; and b) at least one inclined wall defining three zones, from bottom to top: a lower zone provided with a fluidization means, and provided with a grinder placed at the bottom of that zone; an intermediate zone (2) provided with a fluidization means; and an upper zone (3) provided with a fluidization means; and a pipe (11) for introducing the particles reaching into the unit to the level of the intermediate zone.

20 Claims, 5 Drawing Sheets

PROCESS AND DEVICE FOR FLUIDIZED BED TORREFACTION AND GRINDING OF A BIOMASS FEED FOR SUBSEQUENT GASIFICATION OR COMBUSTION

FIELD OF THE INVENTION

The present invention relates to a process for preparing a feed containing fibrous lignocellulosic material, alone or mixed with a hydrocarbon cut in order to supply a gasification unit or a combustion system. The invention also allows wood chips to be prepared with a view to using them in the field of vinification processes.

An important application of the device of the invention is the preparation of a lignocellulosic biomass type feed in order to produce of fuels termed "biofuels".

The production line for such biofuels includes a step for gasification supplied with the biomass feed in the form of small particles generally less than 1 mm in size, and with a water content which is generally less than 10% by weight.

The gasification step results in a gas essentially containing carbon monoxide and hydrogen, known to the skilled person as synthesis gas, and also as "syngas". The synthesis gas can then allow a series of hydrocarbon cuts to be recomposed, in particular a gasoline cut and a gas oil cut, by means of the Fischer-Tropsch synthesis. The synthesis gas may also be used as a vector in order to energy production, or as a starting material for the production of bases for chemistry and petrochemistry.

The present invention is not linked to a specific use for the biomass which is prepared to the desired granulometry and water content conditions.

As an example, the unit of the present invention may be used to produce particles of biomass which are dry and calibrated to a sub-mm dimension which can be used in a combustion process (boiler or furnace) or for vinification.

Examples of biomass particles which may be used in the context of the present invention which may be cited are waste from various species of wood, in particular resinous wood, waste of the straw or sugar cane trash type, or any other type of ligneous residue.

In the remainder of the text, as a typical example of a lignocellulosic feed, we shall use wood chips resulting from prior shredding. The shredding step does not form part of the present invention, but if required can be added upstream thereof.

Said wood chips are generally delivered in the form of particles with a largest dimension in the range 2 cm to 5 cm, the smallest dimension being less than 1 cm, generally termed wood pellets, and which may contain up to 40% of water.

In the remainder of the text, for simplification, we shall characterize the particles constituting the biomass feed by their largest dimension, knowing that the other dimensions are smaller and that the smallest dimension is less than 1 cm.

The present invention means that the conditioning of the lignocellulosic starting material can be optimized primarily in view of its subsequent treatment in a gasification unit, more particularly an entrained bed gasification unit which requires an input particle size which is generally less than 1 mm, and preferably less than 0.5 mm. Said conditioning generally includes a step for reducing the water content (or drying) of the particles to a degree below 10% by weight, followed by a step for reducing the particle size until a size range is achieved which is suitable for treatment in an entrained bed gasification unit.

In the prior art, the size reduction step is generally carried out in a grinder, said grinding step being greatly facilitated by the upstream torrefaction step since torrefaction is not only accompanied by drying but also by partial destructuring of the lignocellulosic material. Torrefaction can be defined as moderate temperature pyrolysis with a controlled residence time. Typical operating conditions for torrefaction correspond to a temperature in the range 230° C. to 300° C. in the absence of air.

The present invention describes a unit which can carry out the torrefaction step and the grinding step simultaneously in the same vessel. This produces a synergistic effect between the operating conditions for torrefaction, which means that the conditions under which the grinder functions can be optimized. Further, since the unit functions as a fluidized bed, it is very easy to treat, as a mixture with the biomass particles, other solid particles such as oil coke or coal particles. The device of the present invention can treat a mixture of biomass particles and particles of coke or coal with the single proviso that the size of the latter is smaller than that of the biomass particles.

Examination of the Prior Art

The skilled person knows to treat a lignocellulosic biomass type feed by thermolysis or pyrolysis at temperatures in the range 200° C. to 280° C., and with residence times of the order of a few minutes in order to then send it to a fluidized or entrained bed process, in particular to an entrained bed gasification unit. It is also known that mild thermolysis, also termed torrefaction, modifies the structure of the biomass so that the subsequent grinding operations are facilitated, as well as the final shape of the solid particles obtained which are close to spherical particles. In contrast, there is practically no information available regarding the technology used for said torrefaction.

The Applicant's patent FR-2 678 850 describes a pyrolysis furnace adapted to the treatment of domestic waste. That pyrolysis furnace does not employ a fluidized bed.

Patent U.S. Pat. No. 4,787,917 describes a process for torrefaction of wood at a temperature in the range 250° C. to 280° C. in order to produce sticks with a length in the range 5 to 20 mm. That torrefaction process does not employ a fluidized bed.

In general, we have not found a prior art process for torrefaction and grinding operating as a fluidized bed applied to particles with densities in the range 300 to 800 kg/m$^3$, and with dimensions of the order of a few centimeters.

BRIEF DESCRIPTION OF THE INVENTION

Figure 1:
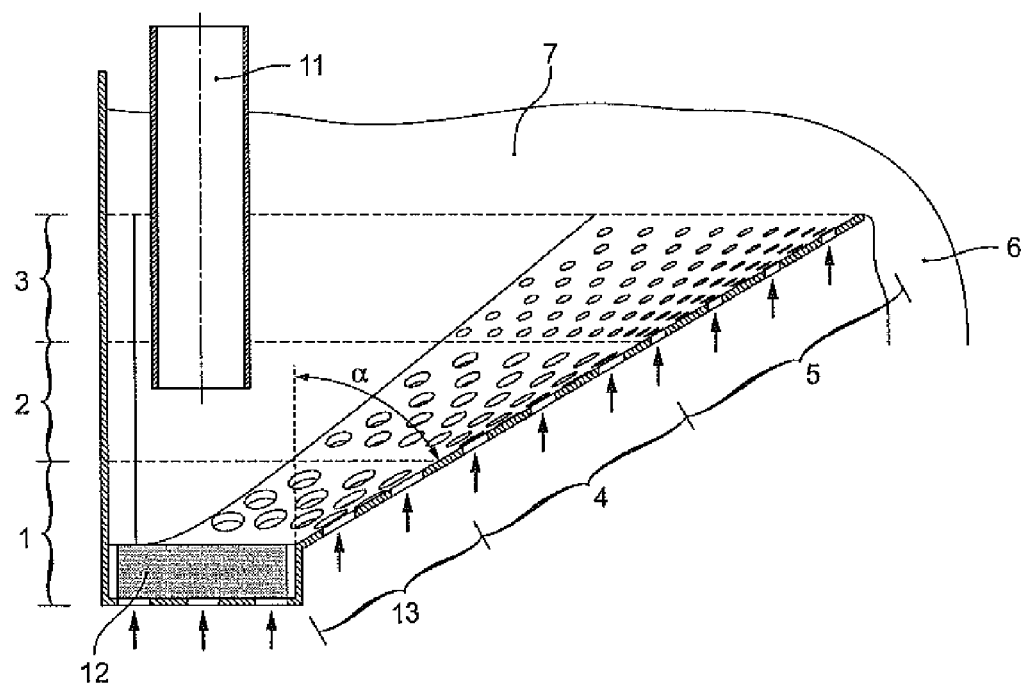
FIG. 1 is a side view of the unit for fluidized bed torrefaction and grinding of the invention. This figure shows a unit operating at atmospheric pressure.
Figure 2:
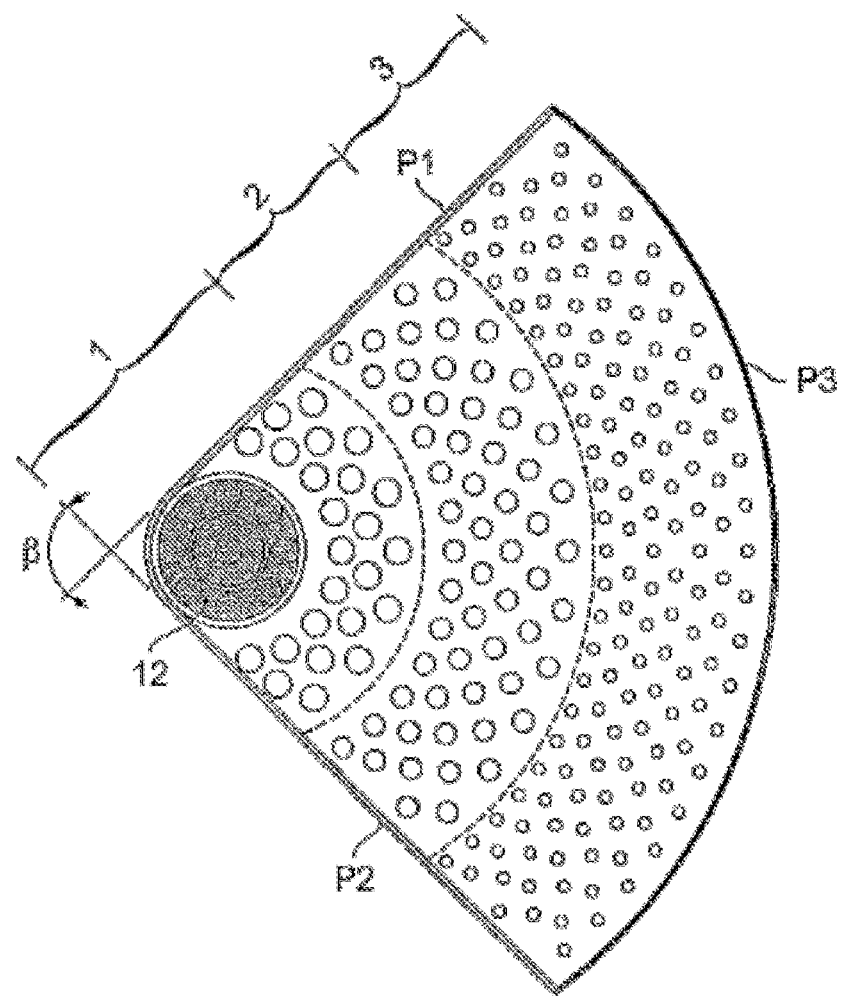
FIG. 2 is a top view of the torrefaction and grinding unit of the invention.
Figure 3:
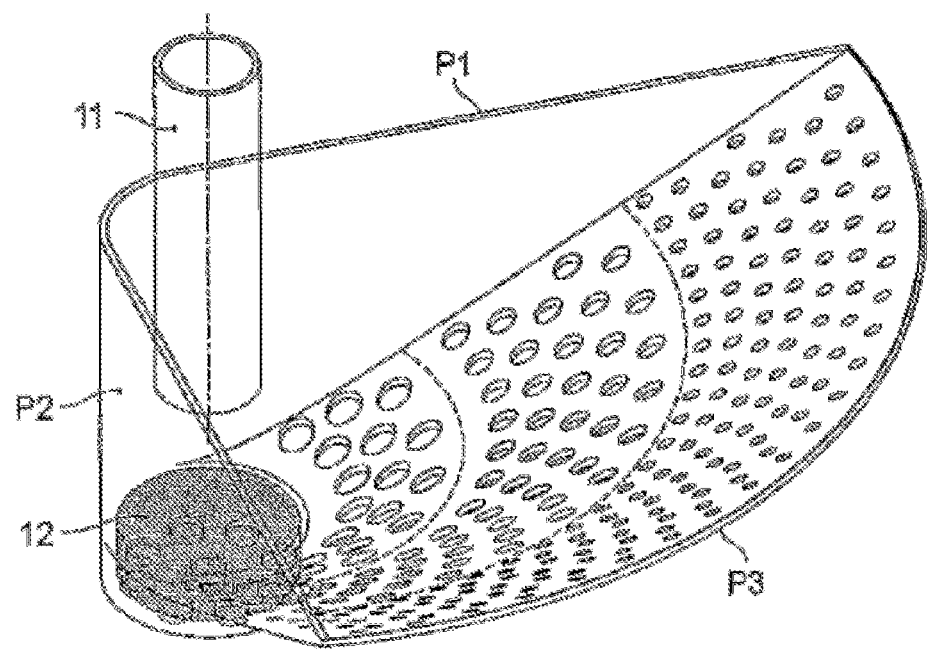
FIG. 3 is a perspective view of the torrefaction and grinding unit of the invention.

The present invention concerns a process for fluidized bed torrefaction and grinding of a feed essentially containing lignocellulosic material in particular in view of its subsequent treatment in a gasification unit. The present invention also defines a unit for carrying out said process.

The starting material is constituted by lignocellulosic type vegetable waste such as chips of various species of wood. This starting material is assumed to be available as chips with a typical dimension in the range 2 cm to 5 cm, with a water content in the range 10% to 40% by weight.

The unit of the invention allows mild pyrolysis, termed torrefaction, to be carried out at a temperature in the range 230° C. to 300° C., preferably in the range 250° C. to 28° C., in the absence of air, in order to reach a water content for the biomass of less than 5% by weight, preferably in the range 2% to 4% by weight.

It can simultaneously allow a reduction in the size of the particles introduced into the unit to a size of less than 1 mm, preferably less than 500 microns. The particle size at the outlet from the unit of the invention may be selected using the velocity of fluidization, as will be explained below.

When it is said that the particles at the unit outlet are less than 1 mm in size, for example, this more accurately means that 95% by weight of a sample removed from the outlet from the unit is constituted by particles less than 1 mm in size.

The process for torrefaction lignocellulosic biomass type material of the present invention assumes that the biomass is available as chips in the range 2 cm to 5 cm in size. In general, these chips have a parallelepipedic shape, and we characterize their size by using the largest dimension.

If needed, a primary grinding step, also termed shredding, will be necessary in order to achieve said chip size, but this does not form an integral part of the present invention.

The torrefaction and grinding unit of the invention functions at a temperature in the range 200° C. to 350° C., preferably in the range 250° C. to 280° C., with a residence time for the coarsest particles in the range 10 to 40 minutes, preferably in the range 15 to 30 minutes. The term "coarsest particles" as used in the context of the invention means particles more than 2 nun in size.

The unit of the invention can function as required up to a pressure of 30 bars (1 bar=$10^5$ pascal), which is an advantage, in particular in the case of subsequent use in a gasification unit. Said entrained bed gasification unit generally functions at a pressure in the range 20 to 40 bars (1 bar $10^5$ Pascal). Thus, the particles of biomass can be transferred directly from the outlet of the present unit toward a downstream gasification unit.

The fluidized bed torrefaction and grinding unit of the invention is constituted by an envelope delimited by two substantially vertical walls P1, P2, and with at least one inclined wall P3, defining three zones from bottom to top:

a lower zone 1 provided with a fluidization means adapted to fluidization of particles in the range 2 mm to 5 mm in size, and provided with a grinder placed at the bottom of said zone;

an intermediate zone 2 provided with a fluidization means adapted to fluidization of particles in the range 1 to 2 mm in size;

an upper zone 3 provided with a fluidization means adapted to fluidization of particles less than 1 mm in size.

The pipe 11 for introducing the particles reaches into the unit, preferably to the level of the intermediate zone 2, and the angle α of the wall P3 inclined with respect to the vertical is generally in the range 30° to 60°, and preferably in the range 35° to 45°.

There are no particular restrictions on the shape of the walls P1, P2, but usually for reasons of simplicity of construction, the walls P1, P2 other than the inclined wall are flat in shape.

Thus, in a preferred variation, the unit for fluidized bed torrefaction and grinding of particles of biomass in accordance with the invention has the general shape of a sector, the angle β of the substantially vertical walls P1 and P2 delimiting said sector, being in the range 30° to 360°, and preferably in the range 45° to 360°. The particular case of an angle of 360° corresponds to a unit which would have a cylindrical shape and in this case, the walls P1 and P2 will be coincident. Such a unit with angle β equal to 360° is entirely within the scope of the invention.

The torrefaction and grinding unit of the invention can function at atmospheric pressure or up to pressures of approximately 50 bars.

In the case of a unit functioning at atmospheric pressure, the upper portion of the unit may be constituted by a simple overflow 6, the level of the fluidized bed 7 in the upper portion naturally being established at a level allowing the treated particles to overflow continuously.

In the case of a unit operating at a pressure of a few tens of bars, the upper portion of the unit is closed and has outlet pipe located in the upper portion of said unit.

The configuration of the upper portion of the unit, in particular the means for evacuating the treated particles, is not an essential characteristic of the unit of the present invention, and may have any shape which is known to the skilled person and may optionally be provided with a means for separating the finest particles and the fluidization gas in order to reintroduce into the unit said finest particles which could possibly have been entrained above the upper zone of the unit.

The unit for torrefaction and grinding of biomass particles in accordance with the invention functions in fluidized bed mode. The means for fluidization of each of the three zones constituting the unit are designed to produce a pressure drop which, as it is routinely practiced by the skilled person, is with respect to the weight of the bed of particles to be fluidized in each of said zones.

Thus, the means for fluidization 13 of the lower zone 1 generates a pressure drop which is generally in the range 0.2 to 1.5 times the weight of the bed of particles with respect to the cross section of said lower zone 1, and preferably in the range 0.3 to 1.0 times the weight of the bed of the particles with respect to the cross section of said lower zone.

The means for fluidization 4 of the intermediate zone 2 generates a pressure drop which is generally in the range 0.2 to 1.5 times the weight of the bed of particles with respect to the cross section of said intermediate zone 2, and preferably in the range 0.3 to 1.0 times the weight of the bed of the particles with respect to the cross section of said intermediate zone.

And the means for fluidization 5 of the upper zone 3 generate a pressure drop which is generally in the range 0.2 to 1.5 times the weight of the bed of particles with respect to the cross section of said upper zone 3, and preferably in the range 0.3 to 1.0 times the weight of the bed of the particles with respect to the cross section of said upper zone.

The means for fluidization of each of zones 1, 2 and 3 are not necessarily identical.

Usually, the fluidized means are constituted by perforated screens, the dimension and the density of the orifices being determined by the value of the pressure drop maintained in each of the zones.

However, the unit of the present invention may use types of fluidization means other than screens, and is compatible with any of the fluidization systems developed by the skilled person.

The fluidization velocities for each zone of the unit are determined in order to fluidize the coarsest particles in the lower zone of the unit, to fluidize the particles with an intermediate size in said intermediate zone, and to fluidize the smallest particles leaving the unit in said upper zone of the unit.

Thus, the fluidization velocity in the lower zone 1 of said unit is generally in the range 1.3 to 2.5 times the minimum fluidization velocity of particles with a diameter in the range 1 to 2 mm.

The fluidization velocity in the intermediate zone 2 of said unit is generally in the range 1.3 to 2 times the minimum fluidization velocity of particles with a diameter in the range 1 to 2 mm.

The fluidization velocity in the upper zone 3 of said unit is generally in the range 1.3 to 1.5 times the minimum fluidization velocity of particles with a diameter of less than 1 mm.

The torrefaction and grinding unit of the present invention can achieve a mean residence time for the coarsest biomass particles which is generally in the range 10 to 40 minutes, preferably in the range 15 to 30 minutes.

In general, the temperature inside said unit is determined in order to achieve the conditions for torrefaction, i.e. a temperature which is generally in the range 230° C. to 300° C., preferably in the range 250° C. to 280° C.

In accordance with a preferred characteristic of the unit according to the invention, the grinder 12 provided in the lower zone of the unit of the invention is placed at the bottom of said zone such that the distance between the ends of said grinder and the wall of the lower zone 1 which is the closest is in the range 0.5 to 2 times the diameter of the coarsest particles present in the unit.

In accordance with another preferred characteristic of the invention, the grinder 12 placed in the lower zone of the unit of the invention has contusive protrusions on the stator 8 and corresponding contusive protrusions on the rotor 10, so that the gap between said protrusions is generally in the range 1.0 to 1.5 times the size of the particles to be obtained at the unit outlet.

DETAILED DESCRIPTION OF THE INVENTION

The fluidized bed torrefaction and grinding unit of the present invention is described below with reference to FIGS. 1, 2, 3 and 4. In each of these figures, corresponding elements are given the same reference numeral.

In the remainder of the text, for simplification, the term "coarse particles" will be used for particles greater than 5 mm in size, "intermediate particles" for particles in the range 2 mm to 5 mm in size, and particles less than 1 mm in size are termed "small particles".

The unit is designed in order to organize a graduation of the fluidization velocity from the bottom of the unit (lower zone 1) adapted to fluidization of coarse particles, the intermediate zone (zone 2) adapted to fluidization of intermediate particles, up to the top of the unit (upper zone 3) adapted to fluidization of small particles.

It should be understood that the zones are not sealed compartments. Because of the agitating nature of fluidization, the particles move from one zone to another, but each zone mainly contains particles corresponding to the velocity of fluidization of said zone. The term "mainly" means a percentage presence of particles in the zone corresponding to their fluidization velocity of at least 50%, and preferably at least 70%. Achievement of this objective depends on the choice of the velocities of fluidization in each of the zones.

The particles of biomass to be treated are introduced via the top of the unit, generally under gravity, using a channel denoted 11 which opens into the bed of particles, preferably into the intermediate zone 2.

Particles of the desired size (less than 1 mm) are evacuated from the lower portion of the unit via a channel 6 or, optionally, via a simple overflow. The coarsest particles are principally located in the lower zone 1 where they are fluidized by the presence of intermediate particles, which presence allows the particles introduced via the line 11 to be fluidized.

The particles introduced into the unit have a largest dimension in the range 2 cm to 5 cm and in principle cannot be fluidized per se. They are fluidized by mixing them with the fluidizable particles present in the intermediate zone 2 and in the lower zone 1. The particles to be treated which are fluidized encounter the grinder installed in the lower zone 1.

Let us assume that a 2 cm particle introduced via the channel 11 encounters the grinder which fragments it into a certain number of smaller particles, certain of them having the required size at the unit outlet, others being larger in size than the required size. Those particles which are not of the required size, for example 5 mm, will stay close to the grinder in the fluidized state and will finish by being ground again, as statistically, the inherent agitation of the fluidized medium will bring them into contact with the grinder. After a certain number of passes through the grinder, the particles introduced into the unit will reach the required size (less than 1 mm, and preferably less than 500 microns), and are then entrained towards the upper zone 3 of the unit where the fluidization velocity corresponding thereto has been established. In fact, at the zone 1, adapted to fluidization of particles in the range 2 to 5 mm, particles less than 1 mm are moving at a velocity which is faster, than their actual fluidization velocity. Thus, they are entrained towards the upper zone 3. Particles with a size of more than 5 mm are returned towards the grinder because of the existence of at least one inclined wall. It has been shown that a single wall of inclined shape is sufficient to encourage the downward movement of the coarse particles.

The angle α of the inclined wall is generally in the range 30° to 60° with respect to the vertical, and preferably in the range 35° to 45°.

Thus, a downward stream of the coarsest particles, more than 5 mm, is established all along the inclined wall P3 extending from the lower zone 1 of the unit to the upper zone 3; the particles are then brought towards the grinder installed in the lower zone 1.

The inclined shape of the wall P3 facilitates the downward movement of the coarsest particles, but any shape which approximately follows an inclined line joining the lower zone 1 and the upper zone 3 of the unit clearly falls within the scope of the invention.

In particular, a part-curvilinear shape, or more generally a shape in which curvilinear portions alternate with rectilinear portions such that the line joining the lowermost point of the lower zone to the uppermost point of the upper zone of the unit, will generally have an angle of inclination a in the range 30° to 60°, and falls within the scope of the present invention. The fluidization gas may be any inert gas such as nitrogen or $CO_2$, to which a portion of the gases derived from torrefaction after separating out the solid particles may optionally be added.

The fluidization means via which the fluidization gas is introduced along the inclined wall P3 may be constituted by a simple perforated screen, the orifices having a diameter and a density designed to satisfy the desired value for the pressure drop across said orifices, and to satisfy the fluidization conditions of the zone under consideration.

Let us take as an example the intermediate zone 2 which fluidizes particles with a diameter in the range 1 to 2 mm. The fluidization velocity in this zone is selected so as to be in the range 1.3 to 2.0 times the minimum fluidization velocity for "medium" particles for said zone, i.e. particles with a typical diameter of 1.5 mm and a density of 500 kg/m$^3$.

The fluidization velocity is defined as the ratio of the flow velocity of gas introduced into the zone under consideration to the cross section of said zone. The flow velocity of the gas is fixed by the fluidization velocity to be produced in the zone under consideration, and so the diameter and the density of the orifices result from computing the pressure drop across the fluidization means.

The criterion generally used by the skilled person is to produce a pressure drop across the fluidization means in the range 0.3 to 1.5 times the weight of the fluidized layer with respect to the cross section of the zone under consideration, depending on how difficult or easy it is to fluidize the particles under consideration.

Preferably, the diameter of the orifices is kept constant over the whole of the fluidization means and the density of the orifices is varied along the zone in order to produce the desired fluidization velocity in each zone. However, it is also possible to vary the diameter of the orifices in each of the zones, as can be seen by way of illustration in FIGS. 1 and 2, in order to differentiate the lower, intermediate and upper zone better.

The method for dimensioning the fluidization means will be illustrated in the examples which follow the present description.

Figure 4:
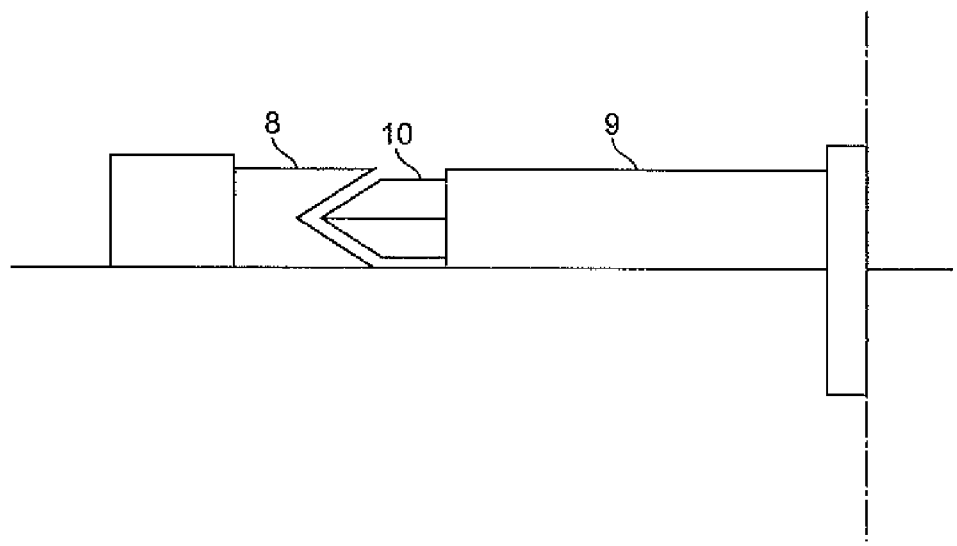
FIG. 4 shows the grinder in more detail with its protrusions forming an integral part of the unit of the invention.
Figure 5:
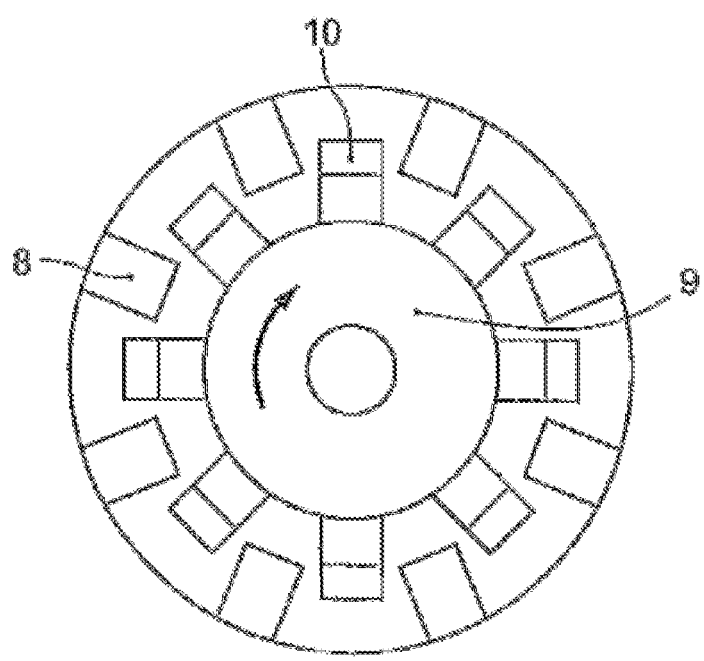
FIG. 5 shows the top view of the grinder in more detail with its protrusions forming an integral part of the unit of the invention.

The grinder 12 located in the lower zone of the unit of the invention has a stator equipped with contusive protrusions 8 and a rotor 9 equipped with protrusions 10 corresponding to the protrusions 8. The term "corresponding protrusions" 8 and 10 means protrusions the shapes of which correspond such that particles less than 1.5 mm in size pass through them. This condition is achieved by adjusting the gap separating two corresponding protrusions. The shapes of the protrusions 8 and 10 may be highly diverse. FIG. 4 shows, by way of example, protrusions 10 in the shape of an arrowhead, and corresponding protrusions 8 forming a notch receiving the point of the arrow.

The grinder is generally driven by means of an electric motor located outside the present reactor.

The lower zone 1 in which the grinder is located is fluidized at a velocity which corresponds to fluidization of particles with a size in the range 2 to 5 mm. Fluidization of particles in the range 2 mm to 5 mm in size induces the fluidization of larger particles, for example with a size of 1 cm to 5 cm introduced into the unit.

One property of fluidized beds is to communicate the fluidized state to particles which are not fluidizable alone, but become so when mixed with fluidizable particles.

Fluidization is carried out using a screen which satisfies the same pressure drop criteria as in the other fluidization means. Fluidization allows that the accumulation of particles close to the grinder can be avoided and can facilitate the repeated passage of particles inside said grinder.

As soon as the particles reach a size of less than 1 mm, they are entrained towards the upper zone of the unit 3 where they are evacuated via the evacuation pipe 6.

The mean residence time for a particle from its introduction into the unit via the supply line 11 to its exit via the evacuation pipe 6 is generally less than 30 minutes, preferably less than 20 minutes.

The temperature of the unit at any point is generally in the range 230° C. to 300° C., and preferably in the range 250° C. to 280° C.

The pressure of the unit is generally between atmospheric pressure and 30 bar (1 bar=10$^5$ Pascal).

The choice of the pressure depends on the operating pressure of the downstream gasification unit.

The present unit means that the torrefaction and grinding processes can be closely coupled and implies a true synergistic effect. The skilled person is in fact aware that torrefaction is accompanied by weakening of the lignocellulosic structure and facilitates subsequent grinding.

Installing a grinder functioning within a fluidized bed in the unit operated under torrefaction operating conditions means that the function of said grinder which receives a majority of the roasted particles can be optimized, i.e. more precisely, a majority of the particles which have remained under torrefaction conditions.

Further, differentiation of the fluidization velocities between the lower zone 1 and the upper zone of the unit 3 means that the lower zone can be free from fine particles, i.e. those which are less than 1 mm in size, which would not be the case in the absence of differentiated fluidization which could mean that the fine particles formed close to the grinder remain there.

EXAMPLES

The first example concerns a unit in accordance with the invention operating at atmospheric pressure and treating particles of biomass in the form of wood pellets with dimensions of 2 cm×3 cm×5 cm with a water content of 35% by weight with a view to obtaining particles less than 500 microns in size and with a water content of less than 5% by weight.

The feed flow velocity of the biomass to be treated is: 20000 tones/year, i.e. 2.31 tones/hour. The torrefaction and grinding unit of the invention corresponded to a conical sector with a peak angle β of 90° and had the following dimensions:

Total height: 2.5 m
Maximum diameter (at upper zone): 4.6 m
Diameter of grinder (lower zone): 0.5 m
Intermediate zone diameter: 0.5 to 3.6 m
Upper zone diameter: 3.6 to 4.6 m
Angle (α) of inclined wall to vertical: 43°
Velocity of fluidization in zone 1 and 2: 27.3 cm/s
Velocity of fluidization in zone 3: 6.3 cm/s
Mean void fraction of fluidized bed: 0.47
Mean residence time of particles: 20 minutes
Gas flow velocity in zone 1 and 2: 1305 Nm$^3$/hour
Gas flow velocity leaving zone 3: 190 Nm$^3$/hour The dimensions of the fluidization means for the lower, intermediate and upper zones are determined using the criterion of the pressure drop across said means being selected to be equal to 0.5 times the weight of the bed with respect to the cross section of the zone under consideration and aiming to have gas flow velocities for each orifice in the range 40 m/s to 70 m/s. A simple screen perforated with orifices is selected.

This gives, for the lower and intermediate zones:
orifice diameter: 5.6 mm and 590 orifices per m$^2$ section of screen; and for the upper zone:
orifice diameter: 4.0 mm and 410 orifices per m$^2$ section of screen.

The second example concerns a unit in accordance with the invention operating at a pressure of 30 bar and treating particles of biomass in the form of wood pellets with dimensions of 2 cm×3 cm×5 cm with a water content of 40% by weight with a view to obtaining particles less than 500 microns in size and with a water content of less than 5% by weight.

The feed flow rate of the biomass to be treated was: 40000 tones/year, i.e. 4.62 tones/hour.

The torrefaction and grinding unit of the invention corresponds to a conical sector with a peak angle β of 90° and had the following dimensions:

Total height: 3.4 m
Maximum diameter (at upper zone): 5.0 m
Diameter of grinder (lower zone): 0.6 m
Intermediate zone diameter: 0.5 to 4.2 m
Upper zone diameter: 4.2 to 5.0 m
Angle (α) of inclined wall to vertical: 36°
Velocity of fluidization in zone 1 and 2: 12.0 cm/s
Velocity of fluidization in zone 3: 4.3 cm/s
Mean void fraction of fluidized bed: 0.47
Mean residence time of particles: 15 minutes
Gas flow velocity in zone 1 and 2: 24430 Nm$^3$/hour
Gas flow velocity leaving zone 3: 3500 Nm$^3$/hour.

The dimensions of the fluidization means for the lower, intermediate and upper zones were determined using the criterion of the pressure drop across said means being selected to be equal to 0.5 times the weight of the bed with respect to the cross section of the zone under consideration and aiming to have gas flow velocities for each orifice in the range 40 m/s to 70 m/s.

A simple screen perforated with orifices is selected.

This gives, for the lower and intermediate zones:
orifice diameter: 6.0 mm and 695 orifices per m$^2$ section of screen; and for the upper zone:
orifice diameter: 3.0 mm and 215 orifices per m$^2$ section of screen.

The invention claimed is:

1. A unit adaptable for fluidized bed torrefaction and grinding of particles of biomass with a largest dimension in the range of 2 cm to 5 cm, said unit having a top and bottom and having a general shape of a sector having a) two substantially vertical walls (P1), (P2), joining at an angle (β) to each other, delimiting said sector, in the range of 30° to 360°; and b) at least one inclined wall (P3) defining three zones:
a lower zone (1) adjacent to the bottom of the unit provided with a fluidization means for fluidization of particles in the range of 2 mm to 5 mm in size, and provided with a grinder placed at the bottom of the unit within the lower zone;
an intermediate zone (2) at an intermediate position between the top and bottom of the unit provided with a fluidization means for fluidization of particles in the range of 1 to 2 mm in size;
an upper zone (3) adjacent to the top of the unit provided with a fluidization means for fluidization of particles less than 1 mm in size;
a pipe (11) for introducing the particles to be treated reaching into the unit to the level of the intermediate zone (2), and the angle (α) of the wall (P3) inclined with respect to the vertical being in the range of 30° to 60°.

2. A unit for fluidized bed torrefaction and grinding of particles of biomass according to claim 1, in which the angle (α) of the wall (P3) inclined with respect to the vertical is in the range of 35° to 45°.

3. A unit for fluidized bed torrefaction and grinding of particles of biomass according to claim 1, in which the grinder provided at the bottom of the unit is positioned such that a distance between the grinder and the walls at the bottom of the unit is in the range of 0.5 to 2 times the diameter of the coarsest particles present in the lower zone (1) of the unit.

4. A unit for fluidized bed torrefaction and grinding of particles of biomass according to claim 1, in which the fluidization means of the lower zone (1), the fluidization means (4) of the intermediate zone (2), and the fluidization means (5) of the upper zone (3) is adapted to generate a pressure drop in the range of 0.2 to 1.5 times the weight of the bed of particles with respect to the cross section of the zone under consideration.

5. A unit for fluidized bed torrefaction and grinding of particles of biomass according to claim 1, in which the grinder comprises a stator (8) having protrusions and a rotor (10) having corresponding contusive protrusions such that the gap between said protrusions is in the range 1.0 to 1.5 times the size of the particles to be obtained at the unit outlet.

6. A process comprising conducting fluidized bed torrefaction and grinding of particles of biomass said process comprising providing a unit according to claim 1, in which the temperature inside said unit is in the range of 230° C. to 300° C.; and:
the velocity of fluidization in the lower zone (1) of said unit is in the range of 1.3 to 2.5 times the minimum fluidization velocity for particles with a diameter in the range of 1 to 2 mm; and
the velocity of fluidization in the intermediate zone (2) of said unit is in the range of 1.3 to 2.0 times the minimum fluidization velocity for particles with a diameter in the range of 1 to 2 mm; and
the velocity of fluidization in the upper zone (3) of said unit is in the range of 1.3 to 1.5 times the minimum fluidization velocity for particles with a diameter of less than 1 mm.

7. A process for the fluidized bed torrefaction and grinding of particles of biomass in the unit according to claim 6 conducted with a mean residence time for the coarsest biomass particles present in said unit being in the range of 10 to 40 minutes.

8. A unit according to claim 1 wherein said angle (β) is in the range of 45° to 360°.

9. A unit according to claim 4 wherein said pressure drop is in the range of 0.3 to 1.0 times the weight of the bed of particles with respect to the cross section of the zone under consideration.

10. A unit for fluidized bed torrefaction and grinding of particles of biomass according to claim 2, in which the diameter of the grinder is such that the distance between the ends of said grinder and a wall of the lower zone (1) is in the range of 0.5 to 2 times the diameter of the coarsest particles present in the lower zone (1) of the unit, there being no other wall of the lower zone (1) that is closer to the ends of said grinder than said wall.

11. A unit for fluidized bed torrefaction and grinding of particles of biomass according to claim 2, in which the fluidization means of the lower zone (1), the fluidization means (4) of the intermediate zone (2), and the fluidization means (5) of the upper zone (3) is adapted to generate a pressure drop in the range of 0.2 to 1.5 times the weight of the bed of particles with respect to the cross section of the zone under consideration.

12. A unit for fluidized bed torrefaction and grinding of particles of biomass according to claim 10, in which the fluidization means of the lower zone (1), the fluidization means (4) of the intermediate zone (2), and the fluidization means (5) of the upper zone (3) is adapted to generate a pressure drop in the range of 0.2 to 1.5 times the weight of the bed of particles with respect to the cross section of the zone under consideration.

13. A process according to claim 6, wherein the temperature is 250° C. to 280° C.

14. A process according to claim 7, wherein said mean residence time is 15 to 30 minutes.

15. A unit adaptable for fluidized bed torrefaction and grinding of particles of biomass with a largest dimension in the range of 2 cm to 5 cm, said unit having a top and bottom and having a general shape of a sector having a) two substantially vertical walls (P1), (P2), joining at an angle (β) to each other, delimiting said sector, in the range of 30° to 360°; and b) at least one inclined wall (P3) defining three zones:
- a lower zone (1) adjacent to the bottom of the unit provided with a perforated screen suitable for fluidization of particles in the range of 2 mm to 5 mm in size, and provided with a grinder placed at the bottom of the unit within the lower zone;
- an intermediate zone (2) at an intermediate position between the top and bottom of the unit provided with a perforated screen suitable for fluidization of particles in the range of 1 to 2 mm in size;
- an upper zone (3) adjacent to the top of the unit provided with a perforated screen suitable for fluidization of particles less than 1 mm in size;

a pipe (11) for introducing the particles to be treated reaching into the unit to the level of the intermediate zone (2), and the angle (α) of the wall (P3) inclined with respect to the vertical being in the range of 30° to 60°.

16. A unit for fluidized bed torrefaction and grinding of particles of biomass according to claim 15, in which the angle (α) of the wall (P3) inclined with respect to the vertical is in the range of 35° to 45°.

17. A unit for fluidized bed torrefaction and grinding of particles of biomass according to claim 15, in which the grinder provided at the bottom of the unit is positioned such that a distance between the grinder and the walls at the bottom of the unit is in the range of 0.5 to 2 times the diameter of the coarsest particles present in the lower zone (1) of the unit.

18. A unit for fluidized bed torrefaction and grinding of particles of biomass according to claim 15, in which the perforated screen of the lower zone (1), the perforated screen (4) of the intermediate zone (2), and the perforated screen (5) of the upper zone (3) is adapted to generate a pressure drop in the range of 0.2 to 1.5 times the weight of the bed of particles with respect to the cross section of the zone under consideration.

19. A unit for fluidized bed torrefaction and grinding of particles of biomass according to claim 15, in which the grinder comprises a stator (8) having protrusions and a rotor (10) having corresponding contusive protrusions such that the gap between said protrusions is in the range 1.0 to 1.5 times the size of the particles to be obtained at the unit outlet.

20. A process comprising conducting fluidized bed torrefaction and grinding of particles of biomass said process comprising providing a unit according to claim 15, in which the temperature inside said unit is in the range of 230° C. to 300° C.; and:
- the velocity of fluidization in the lower zone (1) of said unit is in the range of 1.3 to 2.5 times the minimum fluidization velocity for particles with a diameter in the range of 1 to 2 mm; and
- the velocity of fluidization in the intermediate zone (2) of said unit is in the range of 1.3 to 2.0 times the minimum fluidization velocity for particles with a diameter in the range of 1 to 2 mm; and
- the velocity of fluidization in the upper zone (3) of said unit is in the range of 1.3 to 1.5 times the minimum fluidization velocity for particles with a diameter of less than 1 mm.

\* \* \* \* \*